May 21, 1968  B. F. MONROE  3,384,415
RETRACTABLE SEAT BELT
Original Filed Aug. 9, 1963  3 Sheets-Sheet 1
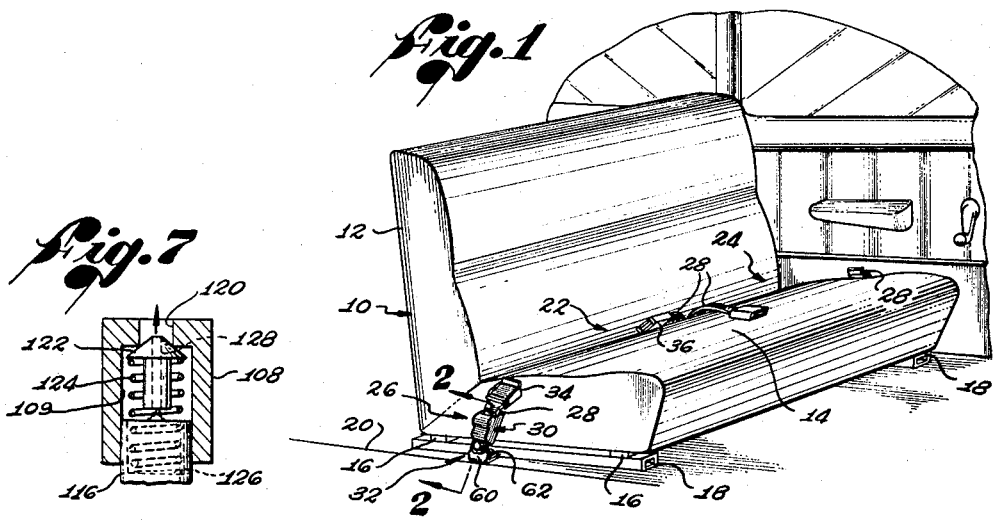
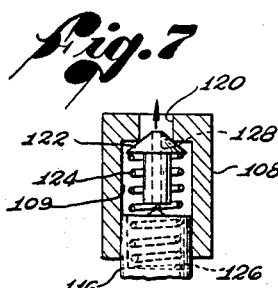
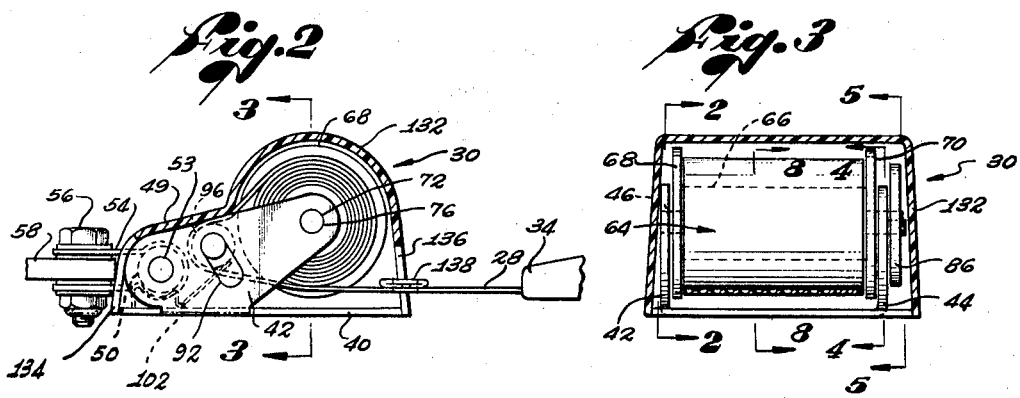
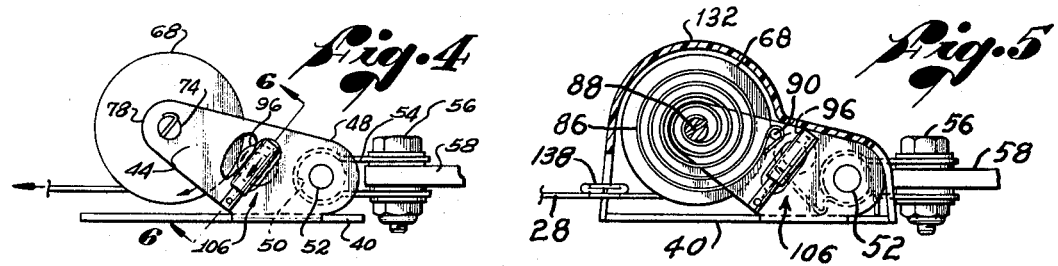
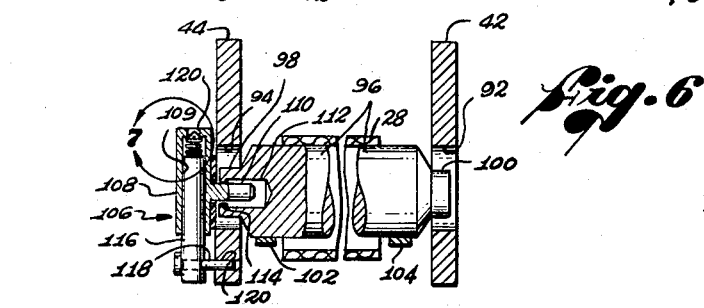
INVENTOR.
BENJAMIN F. MONROE
BY Fulwider, Patton, Rieber,
Lee, and Utecht
Attorneys

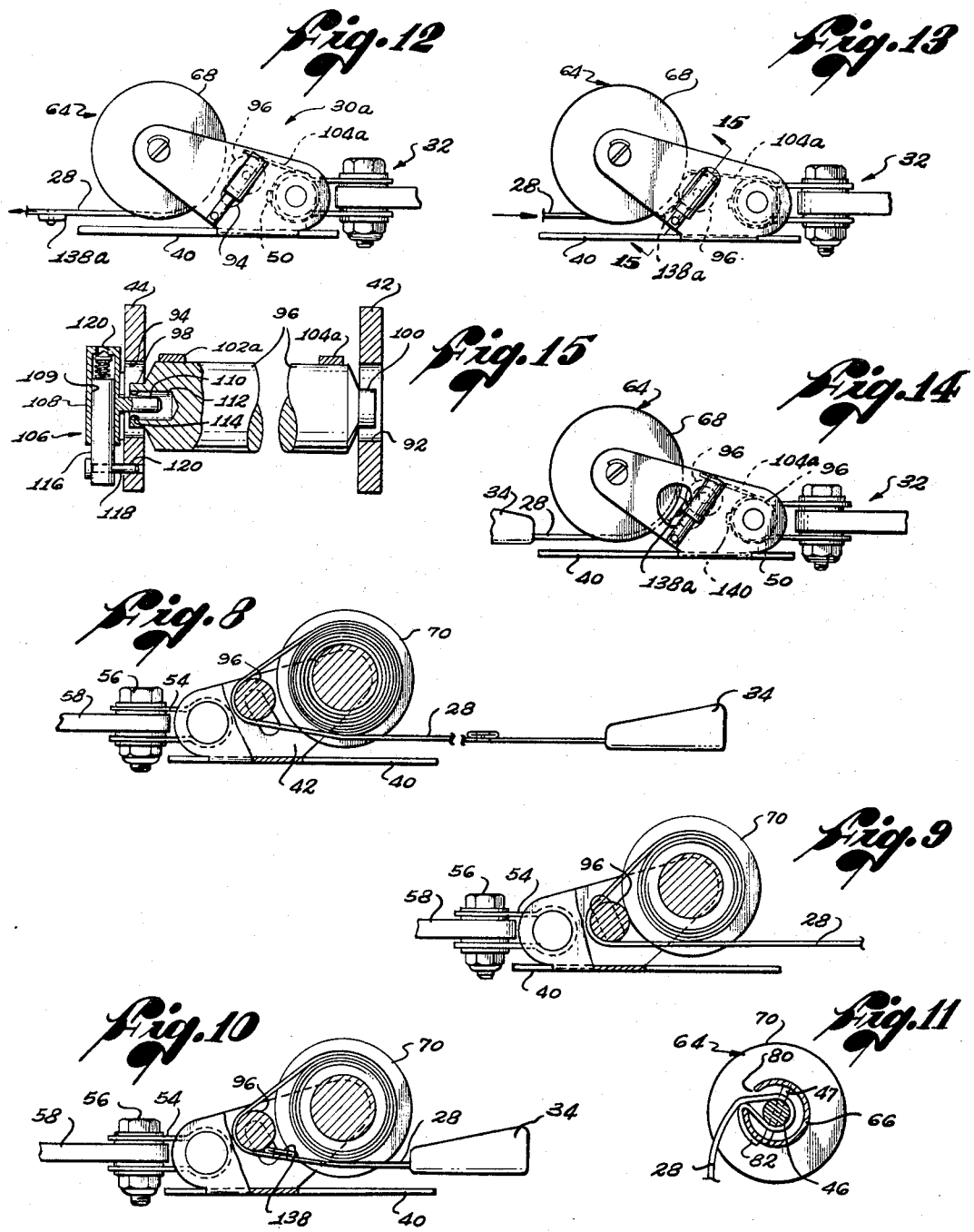

May 21, 1968     B. F. MONROE     3,384,415
RETRACTABLE SEAT BELT
Original Filed Aug. 9, 1963     3 Sheets-Sheet 3
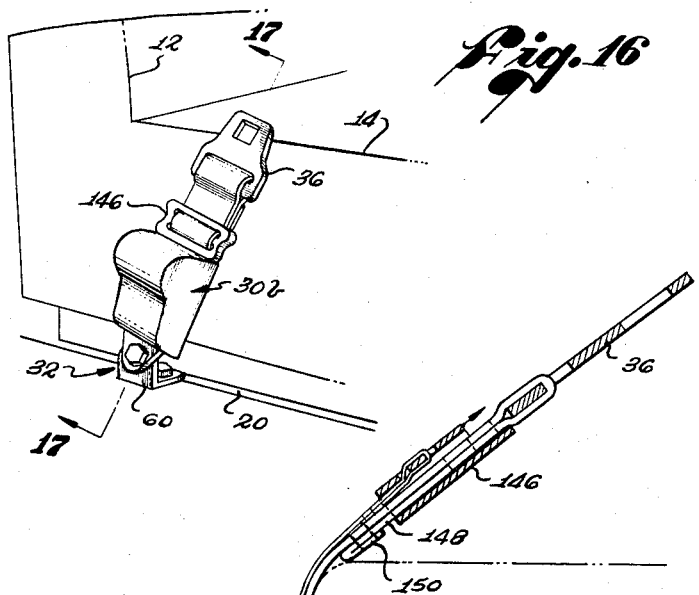
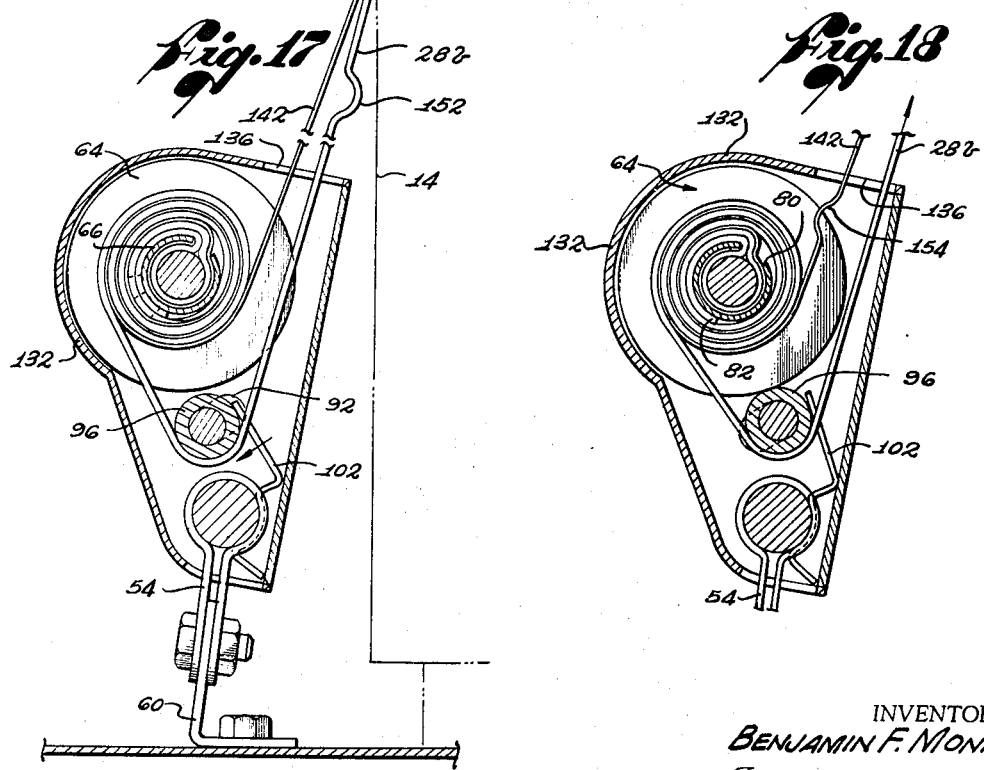
INVENTOR.
BENJAMIN F. MONROE
BY Fulwider, Patton, Rieber,
Lee, and Utecht
Attorneys

United States Patent Office 3,384,415
Patented May 21, 1968

3,384,415
RETRACTABLE SEAT BELT
Benjamin F. Monroe, 230 N. Barrington Ave.,
Los Angeles, Calif. 90049
Continuation of application Ser. No. 301,016, Aug. 9,
1963. This application July 7, 1965, Ser. No. 473,894
32 Claims. (Cl. 297—388)

This invention relates generally to safety seat belts for automobiles, airplanes, and the like vehicles, and more particularly to improvements in means for automatic retraction of such belts when not in use together with automatic adjustment and locking of the belts at the required length when put into use.

This application is a continuation of copending application Ser. No. 301,016, filed Aug. 9, 1963, now abandoned.

Automatically retracting seat belts of both the lap and shoulder harness type have heretofore been well known, but such belts have usually required somewhat difficult and time consuming manual adjustments of the length of the belt for suitable fit to each user, and such adjustment has usually been performed by means associated with the belt buckle.

It is, accordingly, an important object of this invention to provide a seat belt that, when unbuckled, not only automatically and immediately returns to a fully retracted and protected position out of the way of the seat occupant, but which may be easily and quickly extended from such retracted position to a buckled position about the occupant of the seat, and such belt will automatically be locked and restrained from further extension while in use without adjusting or unlocking manipulations on the part of the occupant.

Another object of this invention is to provide a retractable seat belt that is automatically adjustable to the required size for the person occupying the seat.

Another object of this invention is to provide a seat belt of improved strength, construction, and ease of operation.

These and other objects, advantages, and features of novelty will be apparent hereinafter.

In the drawings which illustrate presently preferred embodiments and modes of operation of the invention and in which like reference characters designate the same or similar parts throughout the several views:

FIGURE 1 is a perspective view of a retractable seat belt installation embodying the features of this invention as installed in readiness for use, by way of example, in an automobile seat.

FIGURE 2 is a side elevational view taken approximately on line 2—2 of FIGURE 1 or FIGURE 3 with portions of the housing of the belt retraction and extension apparatus removed to expose the interior mechanism.

FIGURE 3 is a cross sectional view taken on line 3—3 of FIGURE 2.

FIGURE 4 is a side elevational view of the apparatus, as viewed from line 4—4 of FIGURE 3, with the housing removed and a portion of the interior cut away to show the mechanism therein, the belt locking mechanism therein being shown in locked position.

FIGURE 5 is a side sectional elevation of the apparatus similar to FIGURE 4, but as viewed from line 5—5 of FIGURE 3 with the housing in place and showing the belt locking mechanism therein in unlocked position.

FIGURE 6 is an enlarged, fragmentary sectional view taken approximately on line 6—6 of FIGURE 4.

FIGURE 7 is an enlarged, fragmentary sectional view of that portion of FIGURE 6 enclosed within circle 7.

FIGURE 8 is a longitudinal sectional view similar to FIGURE 2, but taken on line 8—8 of FIGURE 3 and with the housing removed and showing the belt locking mechanism in unlocked position.

FIGURE 9 is a longitudinal sectional view similar to FIGURE 8, showing the belt locking mechanism in locked position.

FIGURE 10 is a longitudinal sectional view similar to FIGURES 8 and 9 and illustrating the means and mode of operation for releasing the belt locking mechanism.

FIGURE 11 is a fragmentary, cross sectional view through the belt retraction reel showing the belt and attachment means.

FIGURE 12 is a side elevational view similar to FIGURE 4, but illustrating a modified form of the apparatus of the invention, the belt locking mechanism being here shown in an interim unlocked position.

FIGURE 13 is a side elevational view similar to FIGURE 12, showing the belt locking mechanism in locked position.

FIGURE 14 is a side elevational view similar to FIGURES 12 and 13, showing the means and mode of operation for releasing the belt locking mechanism.

FIGURE 15 is an enlarged, fragmentary sectional view taken approximately on the line 15—15 of FIGURE 13.

FIGURE 16 is a perspective view of a retractable seat belt installation of still another modified form of the invention as installed, by way of example, for use in an automobile seat.

FIGURE 17 is a longitudinal sectional view of the apparatus taken on line 17—17 of FIGURE 16 and showing the belt locking mechanism thereof in unlocked position.

FIGURE 18 is a longitudinal sectional view similar to FIGURE 17, but showing the belt locking mechanism therein in locked position.

Referring now to the drawings, and first in particular to FIGURE 1, a typical or conventional automobile passenger seat installation is shown, by way of example, generally at 10, such installation having a seat back 12 and a supporting seat 14. The seat 14 is supported on suitable supporting leg means 16 which may, in turn, be mounted in floor tracks 18 with means incorporated therewith, not shown, for horizontally and vertically adjusting the position of the seat relative to the floor 20 of the vehicle.

A duplicate pair of side by side seat belt assemblies are shown generally at 22 and 24 suitable for separate application across the laps of a pair of seated passengers, each such installation for each passenger including a pair of similar, independently retractable seat belt assembly units, one of which, in connection with installation 22 for example, is exposed to full view, as indicated generally at 26 adjacent the right hand end of seat 14.

Each of such seat belt assembly units comprises a retractable belt 28 extending out from one end of the housing of a belt retraction reel unit 30, which, in turn, is provided with attachment means 32 at its opposite end for anchoring the unit, preferably below the level of the seat, to a suitable structural member of a vehicle, such as floor 20.

Each of the belts 28 is provided at its outer free end with a coupling fitting which, for example in assembly 26, consists of a latch buckle 34 and in the opposite matching assembly consists of a mating latch tongue 36, the latter being adapted to be inserted into releasable coupling engagement within the latch buckle 34. Such belt coupling means including the latch buckle 34 and the tongue 36 may be any one of a number of quick coupling and releasing devices obtainable and now well known in the art.

Referring next primarily to FIGURES 2–10 inclusive, the belt retraction reel unit 30 includes a generally U-shaped sheet or strip metal supporting frame or body member formed with a base portion 40 having a pair of integral, approximately triangular shaped, upstanding side plates 42 and 44.

Extending crosswise of the frame between the opposite lower end apex portions 48 and 49 of the side plates 42 and 44 is a cross pin 50, having outer reduced diameter end portions, which extend through coaxial holes 52 and 53 in said respective apex portions and are preferably fixed non-rotatable therein by suitable means, such as by riveting or welding the ends thereof to the side plates.

Clampingly encircling the midportion of the cross pin 50 between the side plates 42 and 44 is a generally U-shaped clevis 54, the outer ends of which are clampingly bolted, as shown at 56, to the upper leg 58 of an angle shaped anchor fitting 60, which in the installation herein illustrated has the other leg thereof bolted at 62 to a suitable structural member of the vehicle, such as the floor 20. The clevis 54, bolt 56, and anchor fitting 60 constitute the hereinbefore mentioned attachment means 32.

Rotatably supported by and between the side plates 42 and 44 upon a transverse axle 46 is a belt reel 64 having a cylindrical drum portion 66 with attached end flanges 68 and 70. The axle 46 is fixed to and rendered non-rotatable relative to the drum and flanges of the reel 64 by suitable means such as an intermediately positioned cross pin 47 and, as best shown in FIGURES 2 and 4, the opposite ends of the axle are rotatably supported in bearing holes 72 and 74 provided on the upper apex portions 76 and 78 of the respective side plates 42 and 44. As best shown in FIGURE 11, the drum portion 66 of the reel 64 is provided with a longitudinal slot or opening 80 extending through the side thereof for receiving the inner end of the belt 28 for attachment thereof to the reel. Such attachment is effected by threading the inner end of the belt 28 through the slot 80, looping it around the axle 46 therein with the end protruding a short distance out through the same slot, as shown at 82, such that the several overlying turns of the belt on the reel drum grip the protruding end of the belt against the drum and thereby retain it in firm attachment to the reel. Cross pin 47 is inserted through diametrically aligned holes in the drum 66 and axle 46 and through correspondingly positioned holes in the belt 28.

As best shown in FIGURES 2, 3 and 5, located on the outer side of the side plate 44 and wound substantially coaxial with the reel 64 is a flat spiral spring 86, the inner end of which is fixed in a slot 88 cut diametrically through the end portion of the reel axle 46, and the outer end of which is fixed to a cross pin 90 extending between the side plates 42 and 44. In operation, the reel 64 is rotated such as to wind the spring 86 prior to attaching the inner end of the belt 28 to the drum, as before described, such that the spring 86 applies a rotational winding force or torque through the axle 46 to the reel 64, tending always to wind the belt 28 retractingly onto the drum.

The side plates 42 and 44 are formed with side guide slots 92 and 94, respectively, such guide slots being parallel to one another and substantially normal to a radial plane in which the axis of the reel axle 46 lies. The guide slots are offset lengthwise relative to such radial plane, as shown, in a direction rotationally opposite to the unwinding direction of rotation of the reel unit 30 resulting from lengthening withdrawal of the belt 28 therefrom.

Rotationally and slidably supported crosswise between the side plates 42 and 44 by the guide slots 92 and 94 and with its axis parallel to that of reel unit 30, is a locking roller 96, the reduced diameter opposite end portions 98 and 100 of which rotationally and slidably ride in the aforementioned guide slots 92 and 94, respectively. Sliding lateral displacement of the locking roller 96 along and within the limits of the guide slots 92 and 94, due to the aforementioned lengthwise offset thereof, causes the locking roller 96 to be displaced radially relative to the adjacent edges of the reel end flanges 68 to 70 such that displacement of the locking roller to an upper position, as viewed in FIGURES 2, 5, 8, and 10, positions the cylindrical side of the locking roller 96 adjacent to, but out of contact with the edges of the reel end flanges 68 and 70, whereas displacement of the locking roller to a lower position, as viewed in FIGURES 4 and 9, positions the side of the locking roller 96 into wedging or jamming engagement with the edges of reel end flanges 68 and 70. A pair of light leaf springs 102 and 104 are seatedly retained at their fixed ends between the cross pin 50 and the adjacent inside surface of the base portion 40 and bear at their outer ends upwardly upon the under surface of the end portions of the locking roller 96, thus resiliently biasing the locking roller toward the uppermost position in the guide slots 92 and 94, in which position the locking roller would be out of engagement with the edges of the reel end flanges 68 and 70.

Positioned on the outer face of side plate 44 is a timing mechanism, shown generally at 106, for controlling the rate of lateral displacement of the locking roller 96 in the guide slots 92 and 94 under the force applied to the roller by the belt when under tension, as hereinafter more fully described in connection with the operation of the apparatus. The timing mechanism includes a cylinder 108 pivotally supported at an intermediate section thereof to the end of the locking roller 96 by an integrally formed, radially extending pivot pin 110, which extends coaxially into a cylindrical recess 112 in the end of locking roller 96. The inside diameter of the inner portion of the recess 112 is slightly larger than the outside diameter of the pivot pin 110, but the axially outermost portion of the cylindrical recess is provided with a relatively narrow, annular, reduced inside diameter pivot bearing 114, which makes a relatively close rotational fit around the pivot pin 110. The annular bearing portion 114 may be formed integral with the locking roller, but preferably is made in the form of a press fitted annular ring composed of a low friction material, such as nylon or Teflon. The relatively narrow bearing portion 114 permits slight axial misalignment between the pivot pin and the locking roller 96 without reduction in freedom of relative rotation therebetween.

Axially slidable within the bore 109 of the cylinder 108 is a cylindrical plunger 116, which is pivotally secured adjacent its outer lower end to the side plate 44 by means of a pin 118 which makes a press fit within a drill hole 120 in said side plate. Movement of the locking roller 96 in the slots 92 and 94 will thus result in movement of the cylinder 108 relative to the plunger 116.

As best shown in FIGURE 7, the upper end of the cylinder 108 is provided with a through port 120, which extends coaxially into the clearance space in the upper end of the bore 109 above the upper end of plunger 116. Coaxially contained in the upper end of the bore 109 of the cylinder 108 is a poppet type check valve 122 having a conical shaped valve head, which is pressed into engagement with the inner end of the port 120 by means of a small helical spring 124, the lower end of which spring extends guidingly into a shallow cylindrical recess 126 formed into the upper end of the plunger 116. The spring 124 is of such length and the recess 126 of such depth to accommodate the spring, that the poppet check valve 122 is always resiliently pressed toward engagement with the inner end of port 120 throughout the length of the stroke of the cylinder 108 relative to the plunger 116, as determined by the aforesaid movement of the locking roller 96 within the limit of the guide slots 92 and 94 in the side plates 42 and 44. Extending endwise through the poppet check valve 122 is a relatively small diameter timing orifice 128.

The bolt 28 which is attached to the drum 66 of the reel 64, as hereinbefore described in connection with FIGURE 11, makes a number of turns around the drum, the number of such turns on the drum at any given time depending upon the degree of extension or retraction of the belt relative to the seat belt assembly, as shown in FIGURES 2, 8, 9, and 10, and thence passes from the upper side of the turns on the drum, as viewed in the before mentioned figures, down around the locking roller 96 from whence the belt 28 extends under the turns of the belt on the drum and outwardly from the seat belt unit. The seat belt unit is provided with a detachable housing 132, whcih encloses the seat belt retraction unit 30 except for base slots at the opposite ends thereof, as shown at 134 and 136, through which the attachment clevis 54 and the outwardly extending end of the belt 28, respectively, extend.

A lock release and timer reset lug 138, which may be formed of a relatively thick fold of fabric or plastic material, is attached to and extends crosswise of the belt 28 at a suitable location thereon adjacent the latch buckle 34 for a purpose which will be hereinafter described in connection with the operation of the device.

The operation of the hereinbefore described apparatus of FIGURES 1–11 inclusive is as follows.

Assuming the seat belt 28 initially to be fully retracted, as shown in FIGURE 10, under such condition the belt 28 is fully wound onto the belt reel 64 with the reset lug 138 in abutment with the underside of the locking roller 96. Due to the upward force applied to the locking roller 96 by both the reset lug 138 and the leaf springs 102 and 104, the locking roller 96 is under such condition initially retained in its uppermost position within the guide slots 92 and 94 in opposition to the force on the roller resulting from the tension in the belt. Upon grasping the latch buckle 34 and commencement of unwinding withdrawal of the seat belt 28 from the retraction reel unit 30 preparatory to buckling the seat belt across the occupant's lap, the seat belt will be first wtihdrawn from the reel 64 sufficiently initially to move the reset lug 138 out of contact with the under surface of the locking roller 96 to a position approximating that shown in FIGURES 2 and 8, and by reason of the opposing rotational force applied by the spiral spring 86 to the reel, sufficient increase in tension will be initiated in the belt to apply a force component against and to impart rotation to the locking roller 96 tending to slide and roll it downwardly within the guide slots 92 and 94, against the relatively weaker opposing force of the leaf springs 102 and 104, from the disengaged or unlocked position shown in FIGURES 2, 5, and 10 to a lower position therein, as shown in FIGURES 4 and 9, in which the cylindrical surface of the locking roller 96 is brought into frictional engagement with the edges of the reel and flanges 68 and 70.

However, such downward displacement of the locking roller 96 will not take place immediately during and after withdrawal of the required length of belt from the reel, but will be retarded in time by the damping opposition to such movement resulting from the action of the timing mechanism 106 such that a suitable time interval, preferably in the order of approximately 3 to 5 seconds, is required under such conditions for the completion of the movement of the locking roller 96 from its uppermost disengaged position into the aforesaid frictional engagement with the edges of the reel end flanges 68 and 70. This opposition and retardation of the downward movement of the locking roller 96 results from the opposition to the accompanying downward movement of the cylinder 108 relative to plunger 116 caused by compression of air entrapped in the cylinder bore 109 above the upper end of the plunger 116, the rate of escape of which entrapped air is affected by the size of the timing orifice 128 in the poppet valve 122.

During the interval of time between the initial withdrawal and the final withdrawal of sufficient belt from the reel to permit the completion of buckling thereof across the occupant's lap, the locking roller 96 finally moves into engagement with the edges of the reel end flanges 68 and 70, as hereinbefore mentioned. Thereafter, the withdrawal of any additional length of belt from the reel is prevented by the wedging or jamming action of the locking roller 96 between the guide slots 92 and 94 and the reel end flanges resulting from the rotational and frictional forces applied thereto by the belt, which acts in a self-energizing manner to force the locking roller still further downwardly in the guide slots 92 and 94 which, in turn, forces it into still more forceful jamming engagement with the reel end flanges. Thus, at this stage of the operation of the apparatus, the seat belt is locked against any substantial further extension thereof as would tend to occur in the event the seat occupant is subjected to inertia forces tending to throw him forwardly against the belt.

The action of the locking roller 96 in the slots 92 and 94 is one-way in effect such as always to permit the reel to rotate in a direction tending to wind the seat belt 28 back onto the drum 66 of the belt reel 64 and thus at all times to retract the seat belt. But during any such reeling in action or retraction, the locking roller 96 is always in position to immediately oppose any reverse withdrawal of the seat belt from the reel, thus the action of the device is such as always to maintain tension in the seat belt across the lap of the occupant, but at the same time prevent any slackening of such tension or further extension of the belt.

Upon unbuckling and complete release of the seat belt 28 and the resultant winding of the seat belt onto the drum 66 of the belt reel 64 to its fully retracted position, in which position the reset lug 138 carried on the seat belt 28 is again brought into contact with the under surface of the locking roller 96, as illustrated in FIGURE 10, the locking roller 96 is thereby again lifted upwardly, being assisted by the upward force applied thereto by leaf springs 102 and 104, to the upper limits of the guide slots 92 and 94, at which upper position the locking roller 96 is in its released or unlocked position out of contact with the edges of the reel end flanges 68 and 70, and the reel is thus momentarily free to rotate in either a belt retraction or extension direction. This upward movement of the locking roller 96 meets with only relatively small opposition by the effect of the timing mechanism 106, because upon the attendant upward movement of the timing cylinder 108 relative to the plunger 116, air is permitted to enter the top end of the cylinder wtih only slight resistance by the automatic depression of the poppet valve 122 out of contact with the lower end of the port 120.

In the event at any time the seat occupant wishes to release the tension in or extend the length of the previously attached seat belt 28, this can be only accomplished by first unbuckling the belt and allowing it to return freely to its fully retracted position, at which fully retracted position the locking mechanism will be fully disengaged in the manner hereinbefore described. Following such disengagement of the locking mechanism, the belt can then be rewithdrawn to the desired increased length and rebuckled over the occupant's lap during the interval of time required for the locking mechanism again to become effective, as hereinbefore described, again to immobilize the belt against any further withdrawal or lengthening action.

Referring next primarily to FIGURES 12–15 inclusive, which illustrate a modified form of the apparatus of the invention, the general installation thereof is the same or similar to that shown and hereinbefore described in connection with FIGURE 1, and the belt 28, retraction reel unit 30a, base portion 40, and the attachment fittings 32 for anchoring the unit to the vehicle structure and also the latch buckle are in general the same as the buckle fittings 34 and 36 hereinbefore described in connection with FIGURES 1–11 inclusive, the only modification thereto being in certain details of construction of the belt locking mechanism within the retraction reel unit, as will be hereafter described.

In the modified form of the reel unit 30a, the seat belt 28 instead of passing around and over the locking roller 96, is wound directly onto the reel drum. Also, instead of the pair of leaf springs 102 and 104 positioned as shown in FIGURES 2, 5, and 6, which in the construction there shown urge the locking roller 96 upwardly in the guide slots 92 and 94 away from engagement with the reel, a different pair of leaf springs are employed, as shown at 102a and 104a in FIGURES 12–15 inclusive, the outer ends of which bear downwardly upon the upper surface of the end portions of the locking roller 96, thus resiliently biasing the locking roller into its lowermost position in the guide slots 92 and 94, resulting in the locking roller 96 normally being held in frictional engagement with the edges of the reel end flanges 68 and 70, as shown in FIGURE 13. The inner ends of the leaf springs 102a and 104a partially encircle the clevis cross pin 50 and are each fixed thereto by means of machine screws, as shown at 140.

The seat belt 28 is attached to the drum 66 of the belt reel 64 in the same manner as shown in FIGURE 11 and is wound onto and withdrawn from the reel 64 in substantially the same manner, as hereinbefore described in connection with FIGURES 2–11 inclusive, except as before mentioned it does not pass around the locking roller 96. The seat belt 28 has attached thereto on the under surface thereof adjacent the buckle 34 on the outer end thereof, as viewed in FIGURES 12–14 inclusive, a crosswise extending lock release and timer reset lug 138a, which may be made and attached in the same manner as that of the previously described lock 138. The lock timing mechanism 106, as shown in FIGURE 15, is also identical to that shown in FIGURE 6 and as employed in connection with the apparatus hereinbefore described in connection with FIGURES 1–11 inclusive.

The operation of the hereinbefore described apparatus of FIGURES 12–15 inclusive is as follows.

Assuming the seat belt 28 initially to be fully retracted, as shown in FIGURE 14, under such condition the seat belt 28 is fully wound onto the belt reel 64, thereby filling the belt reel and positioning the reset lock 138a in a wedging position between the surfaces of the edges of the drum end flanges 68 and 70 and adjacent side of the locking roller 96, as shown in FIGURE 14, thereby holding the locking roller 96 in its uppermost position in the guide slots 92 and 94 against the opposing force of the leaf springs 102a and 104a. Upon grasping the latch buckle 34 and commencement of withdrawal of a length of the seat belt 28 from the retraction unit preparatory to buckling the seat belt across the occupant's lap, the seat belt will be unwindingly withdrawn from the reel 64 sufficiently initially to move the reset lock 138a out of contact with the locking roller 96 to a position approximating that shown in FIGURE 12, and by reason of the downward force applied to the locking roller 96 by the leaf springs 102a and 104a, the locking roller 96 will commence to move downwardly within the guide slots 92 and 94 toward a lower position therein, such as shown in FIGURE 12, in which the cylindrical surface of the locking roller 96 is brought into frictional wedging engagement with the edges of the reel end flanges 68 and 70. However, such downward displacement of the locking roller 96 will not take place immediately during and after withdrawal of the lug 138a from supporting abutment with the locking roller 96, but will be retarded in time by the damping opposition to such movement resulting from the action of the timing mechanism 106 such that, as hereinbefore described in connection with the apparatus of FIGURES 1–11 inclusive, a suitable time interval, preferably in the order of approximately 3 to 5 seconds is required for the completion of the movement of the locking roller 96 from its uppermost disengaged position, as shown in FIGURES 12 and 14, into the aforesaid frictional engagement with the edges of the reel end flanges 68 and 70, as shown in FIGURE 13. As hereinbefore described, this opposition in retardation of the downward movement of the locking roller 96 results from the opposition to the accompanying downward movement of the cylinder 108 relative to plunger 116 caused by compression of air entrapped in the cylinder bore 109 above the upper end of the plunger 116, the rate of escape at which entrapped air is effected by the size of the timing orifice 128 in the poppet valve 122.

During the foregoing interval of time, sufficient belt may be withdrawn from the reel to permit the completion of the buckling thereof across the occupant's lap. Thereafter, the withdrawal of any additional length of belt from the reel is prevented by the jamming action of the locking roller 96 against the reel flanges resulting from the rotational and frictional forces therebetween, which act in a self-energizing manner to force the locking roller still further downwardly in the guide slots 92 and 94 which, in turn, forces it into still more forceful jamming engagement with the reel end flanges. Thus, at this stage of the operation of the apparatus, the seat belt is locked against any further extension thereof, as would tend to occur in the event the seat occupant is subjected to inertia forces tending to throw him forwardly against the belt.

The action of the locking roller 96 in the slots 92 and 94 is in effect that of a one way clutch mechanism such as always to permit the reel to rotate in a direction tending to wind the seat belt 28 onto the drum 66 of the belt reel 64, and thus always to tend to retract the seat belt. But during any such action or retraction, short of full retraction in which the reset lug 138a is brought into contact with the roller 96, the locking roller 96 is always in position to immediately oppose any reverse outward withdrawal of the seat belt from the reel, thus the action of the device is such as always to maintain tension of the seat belt across the lap of the occupant, but at the same time to prevent any slackening of such tension or extension of the belt.

Upon complete release of the seat belt 28 and the resultant winding of the seat belt onto the drum 66 of the belt reel 64 to its substantially fully retracted position, the reset lock 138a carried on the seat belt 28 is brought back into contact with the adjacent surfaces of the edges of the reel end flanges 68 and 70 and the side of the locking roller 96, after which in the final retraction movement of the reel end belt, the lug 138a moves to its final position shown in FIGURE 14, thereby lifting the locking roller to its original, released position shown in FIGURE 14. Thereafter, the cycle of withdrawal and rebuckling of the seat belt may be repeated during the time required, as determined by the timing mechanism 106, for the locking roller 96 again to move down in the guide slots 94 and 92 into locking engagement with the reel, as hereinbefore described.

This upward movement of the locking roller 96 meets with only relatively small opposition by the effect of the timing mechanism 106 because upon the intended upward movement of the timing cylinder 108 relative to the plunger 116 air is permitted to enter the top end of the cylinder with only slight resistance by the automatic depression of the poppet valve 122 out of contact with the lower end of the through port 120.

In the event at any time the seat occupant wishes to release the tension in or to extend the length of the seat belt 28, which has been previously buckled across his lap, this can be accomplished only by first unbuckling the belt and allowing it to return freely to the fully retracted position shown in FIGURE 14, at which fully retracted position the locking mechanism will be fully disengaged in the manner hereinbefore described. Following such disengagement of the locking mechanism, the belt can then be withdrawn to the desired increased length and rebuckled over the occupant's lap during the interval of time required for the locking mechanism again to become effective again to immobilize the belt against further withdrawal or lengthening action.

Referring next primarily to FIGURES 16–18 inclusive, which illustrate still another modified form of the apparatus of the invention, the general installation thereof, which is in part shown in FIGURE 16, may be the same as or similar to that shown and hereinbefore described in connection with FIGURE 1, in which a retraction reel unit 30b is provided with attachment fittings 32 for anchoring the unit to the vehicle structure 20, and the latch buckle fittings are in general the same as that hereinbefore described in connection with FIGURES 1–11 inclusive—the latch tongue end 36 being here shown— except that the timing mechanism 106 is omitted, and an auxiliary elongated, flexible control member, such as a tape 142, is employed in conjunction with the seat belt 28b, both being wound in parallel upon the belt reel 64, as shown in FIGURES 17 and 18 and as will be hereinafter described.

In this modified construction of the apparatus of the invention, the main seat belt 28b is attached to and wound upon the drum 66 of the belt reel 64 in the same manner, as shown and hereinbefore described in connection with FIGURE 11. The auxiliary control member or tape 142 is also attached to the drum 66 in face to face contact with the seat belt 28b in the manner shown in FIGURE 17. The seat belt 28b extends from its winding on the drum 66 over the locking roller 96 and out through the slot 136 in the housing in the same manner as that of seat belt 28, hereinbefore described in connection with FIGURES 1–11 inclusive. However, the auxiliary control member 142 which is simultaneously wound onto the drum 66 intermediate the windings of the seat belt 28b thereon extends directly out through the slot 136, without passing over the locking roller 96, and is loopingly attached at its outer end, as shown at 144, to a hollow control slide member 146, which is slidable on the main seat belt 28b adjacent the buckle fitting 36.

The operations of the apparatus of FIGURES 16–18 inclusive is as follows.

As in the case of the apparatus of FIGURES 1–11 inclusive, the locking roller 96 is constantly urged by leaf springs 102 to a position in the guide slots 92 and 94, in which it is in the unlocked position out of engagement with the edges of the reel end flanges 68 and 70, as shown in FIGURE 17. However, by reason of the tension, which normally exists in the seat belt 28b resulting from the constant winding force applied by the winding spring to the reel 64 tending to retractingly wind the belt onto the reel, such resulting tension of the belt applies a force component against the locking roller 96 and normally retains the locking roller 96 against the opposing force of leaf springs 102 and 104 in a position, in which the cylindrical surface of the locking roller 96 is in frictional engagement with the edges of the reel end flanges 68 and 70, as shown in FIGURE 18. Application of increased tension to the seat belt 28b results in augmented jamming action of the locking roller 96 in a self-energizing manner to force the locking roller along the guide slots 92 and 94 into still more forceful locking engagement with the reel end flanges. Thus, at this stage of the operation of the apparatus, the seat belt is locked against the further extension thereof as would tend to occur in the event the seat occupant is subject to inertia forces tending to throw him forwardly against the belt.

The action of the locking roller 96 is such as always to permit the reel to rotate in a direction tending to wind the seat belt 28 back onto the drum 66 under the rewinding force of the spiral spring 86. But during any such reeling in action or retraction, the locking roller, so long as there is any tension in the seat belt 28b, is always in position to immediately oppose any reverse withdrawal of the seat belt from the reel, thus the action of the device is as always to maintain tension in the seat belt across the lap of the occupant, but at the same time prevents any slackening of such tension or any further extension of the belt.

In the event at any time the seat occupant wishes to release the tension in or extend the length of the seat belt 28b either from its fully retracted position or further to extend the length of the previously buckled seat belt, this is accomplished by grasping the slide member 146 and applying thereto an upward pulling force, which results in tension in the control member 142 which, in turn, applies a rotational force to the belt reel 64 in a counterclockwise direction, as viewed in FIGURES 17 and 18, in opposition to the winding force of the reel winding spring. This application of rotational force to the belt reel in opposition to the winding spring makes it possible at the same time or immediately thereafter to introduce slack, as illustrated at 152, into the seat belt 28b. Upon thus introducing slack into the seat belt 28b, the locking roller 96 is freed of the force of the belt 28a thereon, and thus permitted to move under the force of the leaf springs 102 and 104 from its locked position shown in FIGURE 18 to its unlocked, disengaged position shown in FIGURE 17, thus releasing the reel 64 and thereby permitting withdrawal and extension of the belt 28b from the reel 64 by application of further tension through the control member 142. When sufficient length of the seat belt 28b is thus obtained, the control slide member 146 is released, permitting the control member 142 to slacken, as illustrated at 154, thus permitting the belt reel 64 to rotate in a clockwise direction, as viewed in FIGURES 17 and 18, under the winding force of the reel winding spring 86 until tension is again established in the seat belt 28b, whereupon the locking roller 96 is thereby again forced to return in opposition to the forces of leaf springs 102 from the released position shown in FIGURE 17 to the locking position shown in FIGURE 18.

The upper end of the seat belt 28b adjacent its attachment to the buckle latch tongue 36 is provided with a downwardly extending loop portion 148 terminating at its lower end in an upward fold 150 of sufficiently increased thickness to be incapable of passing through the opening extending through the hollow slide member 146. The fold portion 150 thus acts as a stop to prevent the slide member 146 from sliding down the seat belt 28b, thus retaining it always in a convenient position on the seat belt adjacent the buckle fitting. Sufficient length is provided between the stop 150 and the buckle fitting to permit the slide member 146 sufficient sliding movement thereon to effect the hereinbefore described control of the belt reel 64 and the associated locking mechanism.

From the foregoing, it will be apparent that the invention provides a retractable seat belt, which requires no bothersome or time consuming length adjustments, but in effect automatically adjusts itself to the required lengths to accommodate itself to all seat occupants and seat positions, and additionally upon unbuckling of the seat belt and its release, it immediately and automatically retracts from the seat leaving the seat free from the usual clutter heretofore associated with conventional seat belt apparatus.

While the foregoing descriptions have been related primarily to vehicle seat belts, the invention is not limited thereto, but is equally applicable to cargo restraint means and the like applications.

It is to be understood that the foregoing is illustrative only and that the invention is not limited thereby, but may include various modifications and changes made by those skilled in the art within the scope of the invention, as defined in the appended claims.

What is claimed is:

1. In a retractable seat belt assembly, apparatus comprising:

belt take-up means adapted to be anchored to a vehicle structure;

a belt means having the inner end thereof operatively attached to said take-up means and the outer end portion thereof extending from said take-up means;

means included in said take-up means, constantly applying a force to said take-up means, tending to retract said belt means thereinto, whereby said belt means may, in the absence of restraint thereto, be extended from said take-up means against said force by application of sufficient tension thereto, and retracted into said take-up means by said force upon release of such tension;

restraint means carried by said take-up means and energizable in response to application of such tension to said belt means tending to extend said belt means from said take-up means against said force for application of restraint to such extension of said belt means, but providing continuous freedom for retraction of said belt means into said take-up means by said force upon release of such tension;

means responsive to release of such tension for deactivation of said restraint means;

and means for maintaining such deactivation of said restraint means whereby during such deactivation said belt means is free to be extended from said take-up means against said force.

2. In a retractable seat belt assembly, apparatus comprising:

belt take-up means adapted to be anchored to a vehicle structure;

belt means having the inner end thereof operatively attached to said take-up means and the outer end portion thereof extending from said take-up means;

means included in said take-up means, constantly applying a force, tending to retract said belt means thereinto, whereby said belt means may, in the absence of restraint thereto, be extended from said take-up means against said force by application of sufficient tension thereto, and retracted into said take-up means by said force upon release of such tension;

restraint means carried by said take-up means and energizable in response to application of such tension to said belt means tending to extend said belt means from said take-up means against said force, for application of restraint to such extension of said belt means, but providing continuous freedom for retraction of said belt means into said take-up means by said force upon release of such tension;

means, including timing means, responsive to such release of such tension for deactivation of said restraint means and for imposing a predetermined minimum delay time interval between the time of such deactivation of said restraint means and the time when said restraint means is again energizable as aforesaid, whereby during such time interval, said belt means is free to be extended from said take-up means against said force.

3. In a retractable seat belt assembly, apparatus comprising:

belt take-up means adapted to be anchored to a vehicle structure;

belt means having the inner end thereof operatively attached to said take-up means nad the outer end portion thereof extending from said take-up means;

means included in said take-up means, constantly applying a force, tending to retract said belt means thereinto, whereby said belt means may, in the absence of restraint thereto, be extended from said take-up means against said force by application of sufficient tension thereto, and retracted into said take-up means by said force upon release of such tension;

restraint means carried by said take-up means and energizable in response to movement of said take-up means resulting from application of such tension to said belt means tending to extend said belt means from said take-up means against said force, for application of restraint to such extension of said belt means, but providing continuous freedom for retraction of such belt means into said take-up means by said force upon release of such tension;

means, including timing means, responsive to such release of such tension for deactivation of said restraint means and for imposing a predetermined minimum delay time interval between the time of such deactivation of said restraint means and the time when said restraint means is again energizable as aforesaid, whereby during such time interval, said belt means is free to be extended from said take-up means against said force.

4. In a retractable seat belt assembly, apparatus comprising:

belt take-up means adapted to be anchored to a vehicle structure;

belt means having the inner end thereof operatively attached to said take-up means and the outer end portion thereof extending from said take-up means;

means included in said take-up means, constantly applying a force, tending to retract said belt means thereinto, whereby said belt means may, in the absence of restraint thereto, be extended from said take-up means against said force by application of sufficient tension thereto, and retracted into said take-up means by said force upon release of such tension;

restraint means carried by said take-up means and energizable in response to application of such tension to said belt means tending to extend said belt means from said take-up means against said force, for application of restraint to such extension of said belt means, but providing continuous freedom for retraction of said belt means into said take-up means by said force upon release of such tension;

means, including timing means, responsive to retraction of a predetermined portion of said belt means into said take-up means for deactivation of said restraint means and for imposing a predetermined minimum delay time interval between the time of such deactivation of said restraint means and the time when said restraint means is again energizable as aforesaid, whereby during such time interval, said belt means is free to be extended from said take-up means against said force.

5. Apparatus in accordance with claim 4 in which said means responsive to retraction of a predetermined portion of said belt means includes a lug means fixed to an intermediate portion of said belt means for operatively engaging a part of said means for deactivation of said restraint means upon retraction of such predetermined portion of said belt means.

6. In a retractable seat belt assembly, apparatus comprising:

a supporting member adapted to be anchored to a vehicle structure;

a take-up reel rotatably mounted on said member, said reel having a coaxial surface portion;

a belt windingly attached at one end thereof to said reel and with the other end portion thereof extending from said member;

resilient means interconnecting said reel and said member constantly applying a rotational winding force to said reel, whereby said belt may, in the absence of restraint thereby, be extendingly unwound from said reel against said winding force by application of sufficient tension to said outer end portion thereof, and retractingly rewound upon said reel by said winding force upon release of said tension;

and a locking member adjacent to said surface portion of said reel, said locking member being movably mounted in guide means carried by said member for movement at an angle with an adjacent portion of said surface portion, wherein said locking member may be moved into and out of engagement with said surface portion of said reel, said angle being such that when in such engagement said member is drawn into increased wedging engagement with said surface portion upon tendency of said reel to rotate in a belt unwinding direction, thereby automatically restraining the unwinding of said belt from said reel.

7. In a retractable seat belt assembly, apparatus comprising:
- a supporting member adapted to be anchored to a vehicle structure;
- a take-up reel rotatably mounted on said member, said reel having a coaxial surface portion;
- belt windingly attached at one end thereof to said reel and with the other end portion thereof extending from said member;
- resilient means interconnecting said reel and said member constantly applying a rotational winding force to said reel, whereby said belt may, in the absence of restraint thereto, be extendingly unwound from said reel against said winding force by application of sufficient tension to said outer end portion thereof, and retractingly rewound upon said reel by said winding force upon release of said tension;
- a locking member adjacent to said surface portion of said reel, said locking member being movably mounted in guide means carried by said member for movement at an angle with an adjacent portion of said surface portion, wherein said locking member may be moved into and out of engagement with said surface portion of said reel, said angle being such that when in such engagement, said locking member is drawn into increased wedging engagement with said surface portion upon tendency of said surface portion to rotate with said reel in a belt unwinding direction, thereby automatically restraining the unwinding of said belt from said reel;
- and means for controlling the position of said locking member in said guide means relative to such engagement with said surface portion of said reel.

8. Apparatus in accordance with claim 7 in which said means for controlling the position of said locking member relative to such engagement includes resilient force means interacting between said locking member and said supporting member constantly urging said locking member to move guidedly away from such engagement, to permit a portion of said belt means to be extendingly unwound from said reel free from such restraint.

9. Apparatus in accordance with claim 8 in which said means for controlling the position of said locking member relative to such engagement also includes an elongated flexible body windingly attached at one end thereof to said reel and having the other end extending therefrom, whereby tension may be applied to said flexible body to tend to rotate said reel in a direction in apportion to said winding force.

10. Apparatus in accordance with claim 8, and time delay means actuated simultaneously with moving of said locking member away from such engagement for imposing a minimum delay time interval thereafter before said locking member is movable in said slot means back into such engagement with said surface portion of said reel.

11. Apparatus in accordance with claim 8 in which said means for moving said locking member in said slot means away from such engagement with said surface portion includes means actuated by retractingly rewinding a predetermined portion of said belt upon said reel.

12. In a retractable seat belt assembly, apparatus comprising:
- a support member adapted to be anchored to a vehicle structure;
- a take-up reel rotatably mounted on said member;
- a belt having the inner end thereof windingly attached to said reel and the outer end portion thereof extending from said member;
- resilient means interacting between said reel and said member constantly applying a rotational force to said reel tending to wind said belt onto said reel, whereby said belt may, in the absence of restraint thereto, be extendingly unwound from said reel against said winding force by application of sufficient tension to said outer end portion, and retractingly rewound upon said reel by said winding force upon release of said tension;
- control means carried by said member and energizable in response to unwinding of said belt from said reel, for applying restraint to such unwinding of said belt from said reel;
- and time delay means responsive to completion of rewinding of a predetermined portion of said belt on said reel for enforcing a time delay interval between the time of commencement of unwinding of said belt following such completion of rewinding on said reel, and the time when said control means is energizable as aforesaid, again to apply said restraint.

13. In a retractable seat belt assembly, apparatus comprising:
- a support member adapted to be anchored to a vehicle structure;
- a take-up reel rotatably mounted on said member;
- a belt having the inner end thereof windingly attached to said reel and the outer end portion thereof extending from said member;
- resilient means interacting between said reel and said member constantly applying a rotational winding force to said reel tending to wind said belt onto said reel, whereby said belt may, in the absence of restraint thereof, be extendingly unwound from said reel against said winding force by application of sufficient tension to said outer end portion, and retractingly rewound upon said reel by said winding force upon release of said tension;
- control means on said member, energizable in response to unwinding of said belt from said reel for restraint of the unwinding of said belt therefrom, and actuatable by release of said tension for removal of said restraint;
- and time delay means on said member for enforcing a minimum delay time interval between the time of such removal of said restraint and the time when said control means is again energizable as aforesaid.

14. In a retractable seat belt assembly, apparatus comprising:
- a support member adapted to be anchored to a vehicle structure;
- a take-up reel rotatably mounted on said member;
- a belt having its inner end windingly attached to said reel and its outer end extending from said member;
- resilient means interacting between said reel and said member constantly applying a rotational force to said reel tending constantly to wind said belt onto said reel, whereby said belt may, in the absence of restraint thereof, be extendingly unwound from said reel against said force by application of sufficient tension to said outer end and retractingly rewound upon said reel by said force upon release of such tension;
- restraining means on said member tending, in the absence of deactivation thereof, constantly to restrain the unwinding of said belt from said reel, but freely permitting rewinding thereof upon said reel;
- and means actuatable upon said restraining means when a predetermined portion of said belt is retractingly rewound upon said reel, for deactivation of said restraining means.

15. Apparatus in accordance with claim 14 and time delay means automatically actuatable after at least a predetermined minimum interval of time following such deactuation of said restraining means for reactuation of said restraining means.

16. In a retractable seat belt assembly, apparatus comprising:
- a supporting body member adapted to be anchored to a vehicle structure;
- a take-up reel rotatably mounted on said member, said reel having a coaxial portion;
- a locking roller adjacent said coaxial portion of said reel, said roller being movably mounted in slot means carried by said member at an angle with the adjacent portion of said coaxial portion, whereby lateral movement of said roller lengthwise of said slot means toward and away from said coaxial portion, moves the side of said roller respectively into and out of jamming contact with said coaxial portion of said reel;
- a belt windingly attached at one end thereof to said reel and with the other end portion thereof extending from said member;
- resilient means interacting between said reel and said member constantly applying a rotational winding force to said reel, whereby said belt may, in the absence of said jamming contact, be extendingly unwound from said reel against said winding force by application of sufficient tension thereto, and retractingly rewound upon said reel by said winding force upon release of such tension;
- and resilient force means interacting between said roller and said support member constantly urging said roller to move in said slot means toward said jamming engagement with said coaxial portion of said reel.

17. In a retractable seat belt assembly, apparatus comprising:
- a supporting body member adapted to be anchored to a vehicle structure;
- a take-up reel rotatably mounted on said member, said reel having a coaxial concentric surface portion;
- a locking roller adjacent to and parallel with the rotational axis of said surface portion of said reel, said roller being movably mounted in slot means carried by said member at an angle with the adjacent portion of said surface portion, whereby lateral movement of said roller lengthwise of said slot means toward and away from said surface portion moves the said roller respectively into and out of jamming contact with said surface portion of said reel;
- a belt windingly attached at one end thereof to said reel and with the other end portion thereof extending from said member;
- resilient means interconnecting said reel and said member constantly applying a rotational winding force to said reel, whereby said belt may, in the absence of said jamming contact, be extendingly unwound from said reel against said winding force by application of sufficient tension to said outer end portion thereof, and retractingly rewound upon said reel by said winding force upon release of such tension;
- resilient force means interacting between said roller and said support member constantly urging said roller to move in said slot means toward said jamming contact with said surface portion;
- and means carried by said belt and operative upon a predetermined portion of said belt being retractingly rewound upon said reel for moving said roller in said slot means in opposition to said resilient force means away from such contact with said surface portion of said reel.

18. In a retractable seat belt assembly, apparatus comprising:
- a supporting member adapted to be anchored to a vehicle structure;
- a take-up reel rotatably mounted on said member, said reel having a concentric surface portion;
- a locking roller adjacent to and parallel with the rotational axis of said surface portion of said reel, said roller being movably mounted in slot means carried by said member at an angle with an adjacent portion of said surface portion, whereby movement of said roller lengthwise of said slot means toward and away from said adjacent portion moves the said roller respectively into and out of jamming engagement with said surface portion of said reel;
- a belt windingly attached at one end thereof to said reel and with the other end portion thereof extending from said member;
- resilient means interconnecting said reel and said member constantly applying a rotational winding force to said reel, whereby said belt may, in the absence of said jamming engagement, be extendingly unwound from said reel against said winding force by application of sufficient tension to said outer end portion thereof, and retractingly rewound upon said reel by said winding force upon release of such tension;
- resilient force means interacting between said roller and said support member constantly urging said roller to move in said slot means toward said jamming engagement with said surface portion;
- means carried by said belt and operative upon a predetermined portion of said belt being retractingly rewound upon said reel for moving said roller in said slot means in opposition to said resilient force means away from said engagement with said surface portion of said reel;
- and time delay means set simultaneously with said last mentioned moving of said roller for imposing a minimum time delay interval thereafter required for said resilient force means to move said roller in said slot means back into such engagement with said surface portion of said reel.

19. In a retractable seat belt assembly, apparatus comprising:
- a supporting member adapted to be anchored to a vehicle structure;
- a take-up reel rotatably mounted on said member, said reel having a coaxial cylindrical portion;
- a locking roller adjacent to and parallel with the rotational axis of said cylindrical portion of said reel, said roller being movably mounted in slot means carried by said member at an angle with the adjacent portion of said cylindrical portion, whereby lateral movement of said roller lengthwise of said slot means toward and away from said cylindrical portion, moves the adjacent side of said roller respectively into and out of jamming engagement with said cylindrical portion of said reel;
- resilient force means interacting between said roller and said support member constantly urging said roller to move lengthwise of said slot means away from such engagement with said cylindrical surface;
- a belt windingly attached at one end thereof to said reel and with the other end portion thereof extending therefrom around said roller and thence from said member, whereby tension in said belt applies a force to said roller tending to move said roller, in opposition to said resilient force means, lengthwise of said slot means toward and into such jamming engagement with said cylindrical portion of said reel;
- and resilient means interconnecting said reel and said member applying a constant rotational force to said reel, whereby said belt may, in the absence of such jamming engagement, be extendingly unwound from said reel against said rotational force by application of sufficient tension thereto, and retractingly rewound upon said reel by said rotational force upon release of said tension.

20. Apparatus in accordance with claim 19 and means operable by manipulation of said belt for modifying the said force applied to said roller whereby said resilient force means is free to move said roller away from such engagement with said cylindrical surface.

21. In a retractable seat belt assembly, apparatus comprising:

a supporting member adapted to be anchored to a vehicle structure;
a take-up reel rotatably mounted on said member, said reel carrying a coaxial cylindrical portion;
a locking roller adjacent to and parallel with the rotational axis of said cylindrical portion, said roller being laterally movably mounted in slot means carried by said member at an angle with the adjacent portion of said cylindrical portion, whereby lateral movement of said roller lengthwise of said slot means toward and away from said cylindrical portion moves the adjacent side of said roller respectively into and out of frictional engagement therewith;
a belt windingly attached at one end thereof to said reel and extending therefrom supportingly around said roller and thence from said member, whereby tension in said belt applies a displacing force to said roller tending to move roller lengthwise of said slot means toward and into such frictional engagement with said cylindrical portion;
resilient means interconnecting said reel and said member constantly applying a rotational winding force to said reel, whereby said belt may, in the absence of such frictional engagement, be extendingly unwound from said reel against said winding force by application of sufficient tension thereto, and retractingly rewound upon said reel by said winding force upon release of said tension;
resilient force means interacting between said roller and said support member constantly urging said roller, in opposition to said displacing force, to move in said slot means away from engagement with said cylindrical portion;
and means carried by said belt and operative upon a predetermined portion of said belt being rewound upon said reel for shifting said roller in said slot means also in opposition to said displacing force in a direction away from engagement with said cylindrical means.

22. In a retractable seat belt assembly, apparatus comprising:

a supporting member adapted to be anchored to a vehicle structure;
a take-up reel rotatably mounted on said member, said reel having a coaxial cylindrical portion;
a locking roller adjacent to and parallel with the rotational axis of said cylindrical portion of said reel, said roller being laterally movably mounted in slot means carried by said member at an angle with the adjacent portion of said cylindrical portion, whereby lateral movement of said roller lengthwise of said slot means toward and away from said cylindrical portion moves the adjacent side of said roller respectively into and out of jamming engagement with said cylindrical portion of said reel;
a belt windingly attached at one end thereof to said reel and with the other end portion thereof extending therefrom around said roller and thence from said member, whereby tension in said belt applies a displacing force to said roller tending to move said roller lengthwise of said slot means toward and into such jamming engagement with said cylindrical portion of said reel;
resilient means interconnecting said reel and said member constantly applying a rotational winding force to said reel, whereby said belt may, in the absence of such jamming engagement, be extendingly unwound from said reel against said winding force by application of sufficient tension thereto, and retractingly rewound upon said reel by said winding force upon release of said tension;
resilient force means interacting between said roller and said support member constantly urging said roller in opposition to said displacing force to move in said slot means away from such jamming engagement with said cylindrical surface;
means carried by said belt and operative upon a predetermined portion of said belt being rewound upon said reel for shifting said roller in said slot means in opposition to said displacing force in a direction away from such jamming engagement with said cylindrical means;
and means set by said shifting of said roller for imposing a minimum time delay interval thereafter required for said displacing force to move said roller in said slot means, in opposition to said resilient force means, into such jamming engagement with said cylindrical surface.

23. In a retractable seat belt assembly, apparatus comprising:

a member adapted to be anchored to a vehicle structure;
a take-up reel rotatably mounted on said member;
a first belt and a second belt having the inner ends thereof windingly attached to said reel and the outer ends thereof extending from said member;
resilient means interacting between said reel and said member constantly applying a rotational force to said reel tending to wind said belts onto said reel, whereby said belts may, in the absence of restraint thereof, be extendingly unwound from said reel against said force by application of sufficient tension to at least one of said belts and retractingly rewound upon said reel by said force upon release of tension in said belts;
means carried by said member and energizable by said first belt in response to tension therein for restraint of the unwinding of said belt from said reel;
and control means actuatable by application of tension to said second belt for removing said restraint to free said first belt to be extendingly unwound from said reel.

24. In a retractable seat belt assembly, apparatus comprising:

a supporting member adapted to be anchored to a vehicle structure;
a take-up reel rotatably mounted on said member, said reel carrying a coaxial cylindrical portion;
a locking roller adjacent to and parallel with the rotational axis of said cylindrical portion of said reel, said roller being movably mounted in slot means carried by said member at an angle with the adjacent portion of said cylindrical portion, whereby lateral movement of said roller lengthwise of said slot means toward and away from said cylindrical portion moves the adjacent side of said roller respectively into and out of wedging engagement with said cylindrical portion of said reel;
a belt windingly attached at its inner end to said reel and with the outer end portion thereof extending therefrom around said roller and thence from said member, whereby tension in said belt applies a shifting force to said roller tending to move said roller lengthwise of said slot means toward and into such engagement with said cylindrical portion of said reel;
resilient winding means interconnecting said reel and said member constantly applying a rotational winding force to said reel, whereby said belt may, in the absence of such engagement, be extendingly unwound from said reel against said force by application of sufficient extending tension thereto, and retractingly rewound upon said reel by said winding force upon release of said tension;

resilient force means interacting between said roller and said support member constantly urging said roller in opposition to said shifting force to move lengthwise of said slot means away from such engagement with said cylindrical portion;

and control means coupled with said reel for rotational displacement thereof in opposition to the said winding force of said resilient winding means for reducing said extending tension in said belt, thereby to reduce said shifting force sufficient to permit said resilient force means to move said roller lengthwise of said slot means away from such engagement with said cylindrical portion.

25. Apparatus according to claim 24 in which said control means comprises:

an elongated flexible body windingly attached at one end thereof to said reel and having the other end extending therefrom adjacently along the said outer end portion of the belt to a point adjacent the outer end thereof, whereby tension applied to said flexible body relative to said reel tends to rotate said reel in a direction in opposition to said winding force.

26. In a retractable seat belt assembly, apparatus comprising:

a supporting member adapted to be anchored to a vehicle structure;

a take-up reel rotatably mounted on said member, said reel carrying a concentric surface portion;

a belt windingly attached at its inner end to said reel and with the outer end portion thereof extending from said supporting member;

resilient winding means interconnecting said reel and said supporting member constantly applying a rotational winding force to said reel, whereby said belt may, in the absence of restraint thereto, be extendingly unwound from said reel against said force by application of sufficient extending tension thereto, and retractingly rewound upon said reel by said winding force upon release of said tension;

a locking member adjacent to said surface portion of said reel, said locking member being slidably mounted in slot means carried by said supporting member for movement at an angle with the adjacent portion of said surface portion, whereby lateral sliding movement of said locking member lengthwise of said slot means toward and away from said surface portion respectively moves the adjacent side of said locking member respectively into and out of frictional engagement with said surface portion, said angle being such that when in such engagement said locking member is frictionally drawn into wedging engagement with said surface portion upon tendency of said surface portion to rotate with said rotation of said reel in a belt unwinding direction, thereby automatically restraining the unwinding of said belt from said reel;

said belt extending from said reel around said locking member and thence from said supporting member, whereby tension in said belt applies a shifting force to said locking member tending to impart such sliding movement to said locking member lengthwise of said slot means toward and into such frictional engagement with said cylindrical portion of said reel;

and control means coupled with said reel for rotational displacement thereof in opposition to the said winding force of said resilient winding means for reducing said extending tension in said belt, thereby to reduce said shifting force sufficient to permit said resilient force means to impart such sliding movement to said locking member lengthwise of said slot means away from such frictional engagement with said cylindrical portion.

27. In a retractable seat belt assembly, apparatus comprising:

a supporting member adapted to be anchored to a vehicle structure;

a take-up reel rotatably mounted on said member, said reel carrying a concentric surface portion;

a belt windingly attached at its inner end to said reel and with the outer end portion thereof extending from said supporting member;

resilient winding means interconnecting said reel and said supporting member constantly applying a rotational winding force to said reel, whereby said belt may, in the absence of restraint thereto, be extendingly unwound from said reel against said force by application of sufficient extending tension thereto, and retractingly rewound upon said reel by said winding force upon release of said tension;

a locking member adjacent to said surface portion of said reel, said locking member being slidably mounted in slot means carried by said supporting member at an angle with the adjacent portion of said surface portion, whereby lateral sliding movement of said locking member lengthwise of said slot means toward and away from said surface portion moves the adjacent side of said locking member respectively into and out of frictional engagement with said surface portion, said angle being such that when in such engagement said locking member is frictionally drawn into wedging engagement with said surface portion upon tendency of said surface portion to rotate with said rotation of said reel in a belt unwinding direction, thereby automatically restraining the unwinding of said belt from said reel;

said belt extending from said reel around said locking member and thence from said supporting member, whereby tension in said belt applies a shifting force to said locking member tending to impart such sliding movement to said locking member lengthwise of said slot means toward and into such frictional engagement with said cylindrical portion of said reel;

resilient force means interacting between said locking member and said support member constantly urging said locking member in opposition to said shifting force slidably lengthwise of said slot means away from such frictional engagement with said cylindrical portion;

and control means coupled with said reel for rotational displacement thereof in opposition to the said winding force of said resilient winding means for reducing said extending tension in said belt, thereby to reduce said shifting force sufficient to permit said resilient force means to impart such sliding movement to said locking member lengthwise of said slot means away from such frictional engagement with said cylindrical portion.

28. In a retractable seat belt assembly, apparatus comprising:

a supporting member adapted to be anchored to a vehicle structure;

a take-up reel rotatably mounted on said member, said reel carrying a concentric surface portion;

a belt windingly attached at its inner end to said reel and with the outer end portion thereof extending from said supporting member;

resilient winding means interconnecting said reel and said supporting member constantly applying a rotational winding force to said reel, whereby said belt may, in the absence of restraint thereto, be extendingly unwound from said reel against said force by application of sufficient extending tension thereto, and retractingly rewound upon said reel by said winding force upon release of said tension;

a locking member adjacent to said surface portion of said reel, said locking member being mounted on said supporting member for guided movement at an angle with the adjacent portion of said surface portion, whereby such guided movement of said locking member toward and away from said surface portion moves the locking member respectively into and out of frictional engagement with said surface portion, said angle being such that when in such engagement said locking member is frictionally drawn into wedging engagement with said surface portion upon tendency of said surface portion to rotate with said rotation of said reel in a belt unwinding direction, thereby automatically restraining the unwinding of said belt from said reel;

said belt being positioned such that it extends from said reel around said locking member and thence from said supporting member, such that said belt applies a shifting force to said locking member tending to impart such movement of said locking member toward and into such frictional engagement with said cylindrical portion of said reel;

resilient force means interacting between said locking member and said support member constantly urging said locking member in opposition to said shifting force thereby tending to impart such movement away from such frictional engagement with said cylindrical portion;

and control means coupled with said reel for rotational displacement thereof in opposition to the said winding force of said resilient winding means for reducing said extending tension in said belt, thereby to reduce said shifting force sufficient to permit said resilient force means to impart such movement to said locking away from such frictional engagement with said cylindrical portion.

29. A retracting device comprising support means, reel means rotatably mounted in said support means, an elongated flexible element coupled at one end thereof to said reel means and adapted to be wound thereon and unwound therefrom, power means normally, yieldingly, urging said reel in a winding direction, locking means mounted in said support means and adapted to lockingly engage said reel means when said element is unwound from said reel means, time delay means operatively connected with said locking means for delaying engagement thereof with said reel means for a predetermined time.

30. A seat belt retracting device adapted to be mounted in a motor vehicle, said device comprising support means, reel means rotatably mounted in said support means, a seat belt secured at one end thereof to said reel means and adapted to be wound thereon and unwound therefrom, spring means for normally, yieldingly, urging said reel means in a winding direction, locking means mounted in said support means and adapted to lockingly engage said reel means in response to rotation thereof in an unwinding direction, time delay means operatively connected with said locking means for preventing engagement of said locking means with said reel means for a predetermined time after initial rotation of said reel in an unwinding direction.

31. Safety apparatus for use in a motor vehicle having a seat, said apparatus comprising a retracting device mounted in said vehicle in spaced relationship with said seat, a seat belt having one end attached to said device and the other end carrying fastening means adapted to be coupled to complementary fastening means secured to said vehicle, said device comprising locking means adapted to lock said belt against withdrawal from said device while permitting retraction of said belt when said fastening means are released, time delay means operatively coupled to said locking means for delaying the operation thereof for a predetermined time after initial withdrawal of said belt from said device.

32. Safety apparatus for use in a motor vehicle having a seat, said apparatus comprising a retracting device and a first and second seat belt portion, said device being mounted in said vehicle in spaced relationship with said seat, one of said portions being connected at one end thereof to said device, means connecting one end of the other portion to said vehicle, releasable latch means connected to the other ends of said portions, said portions being adapted to be extended across the occupant of the seat to restrain movement therefrom, said device comprising locking means adapted to lock said belt against withdrawal from said device while permitting retraction of said belt when said latch means are released, time delay means operatively coupled to said locking means for delaying the operation thereof for a predetermined time after withdrawal of said seat belt from said retracting device.

References Cited
UNITED STATES PATENTS

| | | | |
|---|---|---|---|
| 1,578,108 | 3/1926 | Tobias | 254—156 |
| 2,557,313 | 6/1951 | Quilter | 297—386 |
| 2,708,555 | 5/1955 | Heinemann et al. | 297—380 |
| 2,964,815 | 12/1960 | Sereno. | |
| 2,971,730 | 2/1961 | Martin. | |
| 3,042,339 | 7/1962 | Gschwind | 242—107.3 X |
| 3,193,327 | 7/1965 | Roe | 297—388 |

CASMIR A. NUNBERG, *Primary Examiner.*

FRANK B. SHERRY, *Examiner.*

R. B. FARLEY, *Assistant Examiner.*